United States Patent
Gailloux et al.

(10) Patent No.: US 8,914,360 B1
(45) Date of Patent: Dec. 16, 2014

(54) SYSTEM AND METHOD FOR PROVIDING LOCATION-BASED VIDEO CONTENT

(75) Inventors: Michael A. Gailloux, Overland Park, KS (US); Devon L. Biere, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2226 days.

(21) Appl. No.: 11/521,130

(22) Filed: Sep. 15, 2006

(51) Int. Cl.
*G06F 17/00* (2006.01)

(52) U.S. Cl.
USPC ............. 707/724; 707/919; 707/920; 725/62

(58) Field of Classification Search
USPC ............... 707/2–3, 10, 104.1, 913, 918–920;
455/412, 414, 466, 517; 709/206, 231,
709/223; 725/53, 91, 114, 131, 70, 110, 32,
725/36, 62; 379/88.13; 386/252, 260, 356;
705/725
See application file for complete search history.

(56) References Cited

U.S. PATENT DOCUMENTS

| | | | | |
|---|---|---|---|---|
| 7,237,201 | B2 * | 6/2007 | Fish | 715/753 |
| 7,606,580 | B2 * | 10/2009 | Granito et al. | 455/456.1 |
| 8,046,428 | B2 * | 10/2011 | Moyer et al. | 709/217 |
| 8,171,516 | B2 * | 5/2012 | Tischer | 725/62 |
| 2002/0007493 | A1 * | 1/2002 | Butler et al. | 725/109 |
| 2002/0091925 | A1 * | 7/2002 | Suzuki et al. | 713/168 |
| 2004/0205087 | A1 * | 10/2004 | Dorsey et al. | 707/104.1 |
| 2006/0026067 | A1 * | 2/2006 | Nicholas et al. | 705/14 |
| 2006/0074550 | A1 * | 4/2006 | Freer et al. | 701/209 |
| 2006/0099964 | A1 * | 5/2006 | Barrese et al. | 455/456.3 |
| 2007/0061364 | A1 * | 3/2007 | Klein, Jr. | 707/104.1 |
| 2007/0100690 | A1 * | 5/2007 | Hopkins | 705/14 |
| 2007/0121846 | A1 * | 5/2007 | Altberg et al. | 379/114.13 |
| 2007/0130019 | A1 * | 6/2007 | Ido et al. | 705/26 |
| 2007/0281692 | A1 * | 12/2007 | Bucher et al. | 455/435.1 |
| 2008/0028335 | A1 * | 1/2008 | Rohrabaugh et al. | 715/800 |
| 2008/0120184 | A1 * | 5/2008 | Aufricht et al. | 705/14 |
| 2012/0323685 | A1 * | 12/2012 | Ullah | 705/14.53 |

OTHER PUBLICATIONS

Lightningcast, Mobile Video Advertising Solution, May 2, 2005.

* cited by examiner

*Primary Examiner* — Augustine K Obisesan
*Assistant Examiner* — Berhanu Mitiku

(57) ABSTRACT

To display a multimedia presentation together with location-based content, a client device reports its location to a content server. The device receives and displays video content from the content server. The device also receives location-based information related to the multimedia presentation. This location-based information may be textual data in an XML (extensible markup language) format. In some embodiments, the multimedia presentation is video content that includes an advertisement for a good or service, and the location-based content identifies a nearby establishment offering the good or service. The client device renders the video and textual data together.

12 Claims, 3 Drawing Sheets

US 8,914,360 B1

SYSTEM AND METHOD FOR PROVIDING LOCATION-BASED VIDEO CONTENT

BACKGROUND

This disclosure relates to the distribution of location-based content, particularly for viewing in a video presentation on a mobile device.

It is becoming ever easier for individuals to access multimedia content when and where they want. An increasing variety of on-demand streaming and downloadable multimedia programming is available to users. In parallel with the rise in content, users are able to access this programming using a greater variety of devices including televisions, computers, and mobile devices such as media-enabled mobile telephones. With the proliferation of content, a variety of business models have been developed in an attempt to profit from offering quality media programming. Various models include selling downloadable clips to be played on portable devices, such as MP3 players or iPod devices, selling a subscription to cable or satellite video service, and providing content for free, often with advertising included or with the hope that the content itself will serve as advertising (such as a short clip from a television program or an upcoming film).

In another trend, an increasing number of location-based services are being made available to users of mobile devices. These services provide a way to send custom advertising or local information to mobile device users based on the location of the device, as determined by, for example, a GPS (Global Positioning System) receiver in the mobile device, or other forms of wireless location technology. Such services can provide users with information on the nearest business of a certain type (e.g., a restaurant), like a kind of local yellow pages that moves around with the user.

SUMMARY

To display a multimedia presentation together with location-based content, a client device reports its location to a content server. The device receives and displays video content from the content server. The device also receives location-based information related to the multimedia presentation. This location-based information may be textual data in an XML (extensible markup language) format. In some embodiments, the multimedia presentation is video content that includes an advertisement for a good or service, and the location-based content identifies a nearby establishment offering the good or service. The client device renders the video and textual data together.

DETAILED DESCRIPTION

I. Overview of an Exemplary Embodiment

Location-based services allow users of mobile devices, such as mobile telephones, to receive information directed specifically to goods, services, and events located in proximity to the user. An exemplary system as described herein combines location-based textual information with pre-recorded multimedia content to give a professionally produced appearance to localized commercial advertisements.

In one embodiment of such a system, users are equipped with media-enabled mobile devices. A user starts media player software and requests a download of multimedia content, such as an entertainment program, from a content server. The mobile device determines its own location and sends that location to the content server. The mobile device then receives and plays the multimedia content.

In addition to receiving the multimedia content, the mobile device receives location-based textual content that corresponds to an advertisement in the entertainment program. The textual content may be, for example, the name or address of a nearby business offering an advertised product. The mobile device renders the textual content together with the commercial advertisement in the multimedia content, so that the advertisement appears to the user to have been professionally produced specifically for the local business.

II. A Location-Specific Multimedia Presentation Method

A. A Location-Specific Multimedia Presentation

Figure 1:
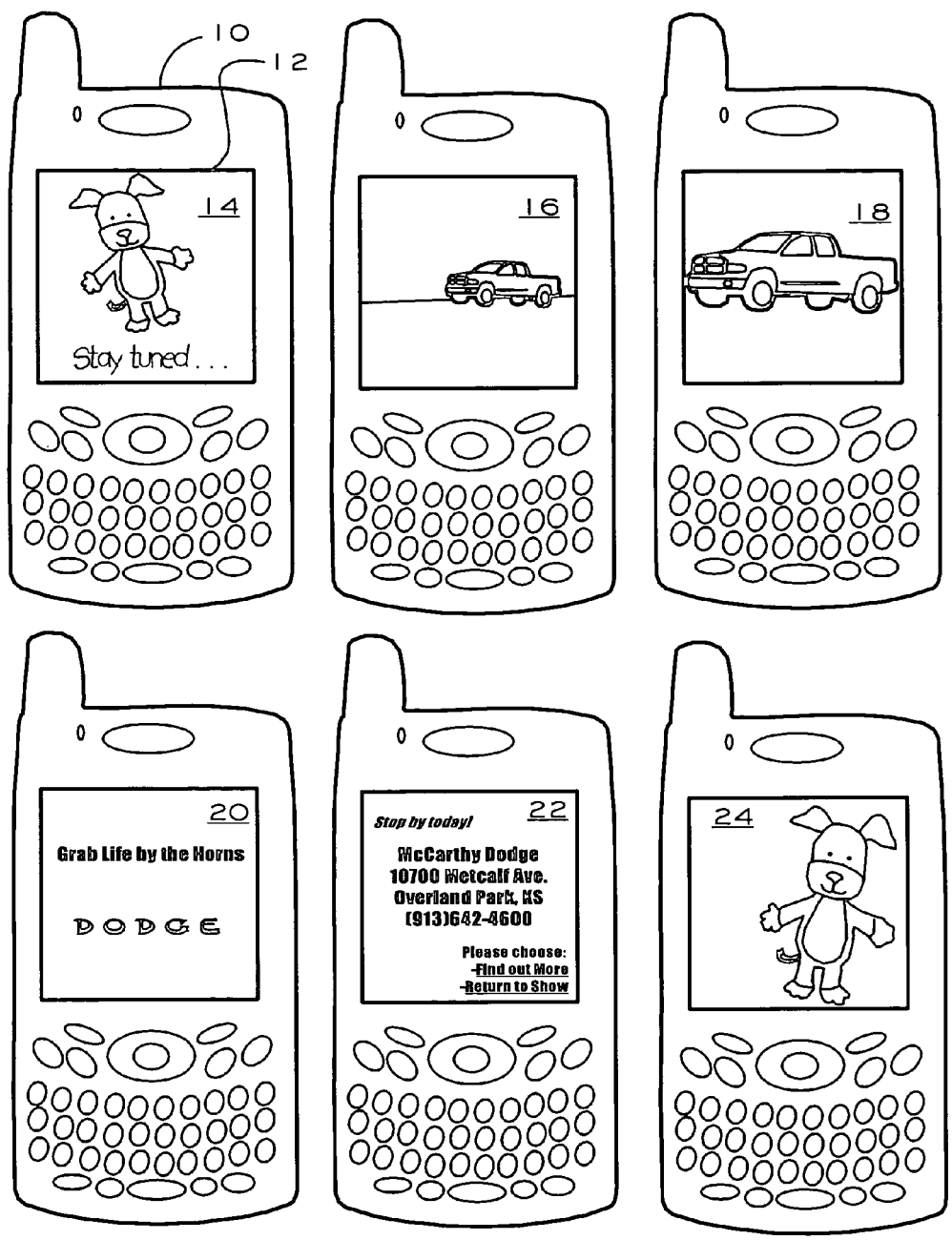
FIG. 1 is a schematic illustration of segments displayed in a video presentation including location-based textual content.

An example of a location-specific multimedia presentation enabled by a system as described herein is illustrated in FIG. 1. A mobile device 10, such as a media-enabled mobile telephone, wirelessly receives multimedia video programming and displays the programming on a video screen 12. The multimedia program includes video entertainment displayed in a first segment 14. Following the first segment, the video programming then cuts to a video commercial advertisement. As illustrated in segments 16 and 18, a commercial advertisement video shows a truck moving across the video screen. In segment 20, the truck image fades to a commercial advertising slogan—for Dodge in this example. In segment, 22, the advertising slogan fades to display the location and contact information for a Dodge dealer ("McCarthy Dodge") located in proximity to the user. Also displayed in segment 22 are hyperlinks (underlined in the Figure) providing the user the option to "Find out More" or to "Return to Show." The "Find out More" link may direct the user to a Web site for the local Dodge dealer, to a Web site for Dodge trucks generally, or to other related information.

When the user selects the "Return to Show" hyperlink, the video entertainment program resumes with segment 24. If a user does not select any hyperlink, the program may resume after passage of a predetermined amount of time, such as five or ten seconds.

A mobile device user in a different location may view the same entertainment program (including segments 14 and 24) including the same commercial advertisement (segments 16, 18, 20), but the textual information rendered in segment 22 may be different, displaying, for example, the name and contact information for a dealer near the second user. Default information may be provided for display in segment 22 if a user's location cannot be ascertained, or if no dealer is sufficiently near the user. The default information may provide a hyperlink or contact information relating to the advertised product generally (e.g., "Visit us at www.dodge.com or stop by your local dealer today!").

B. A Method for Providing a Location-Specific Multimedia Presentation

Figure 2:
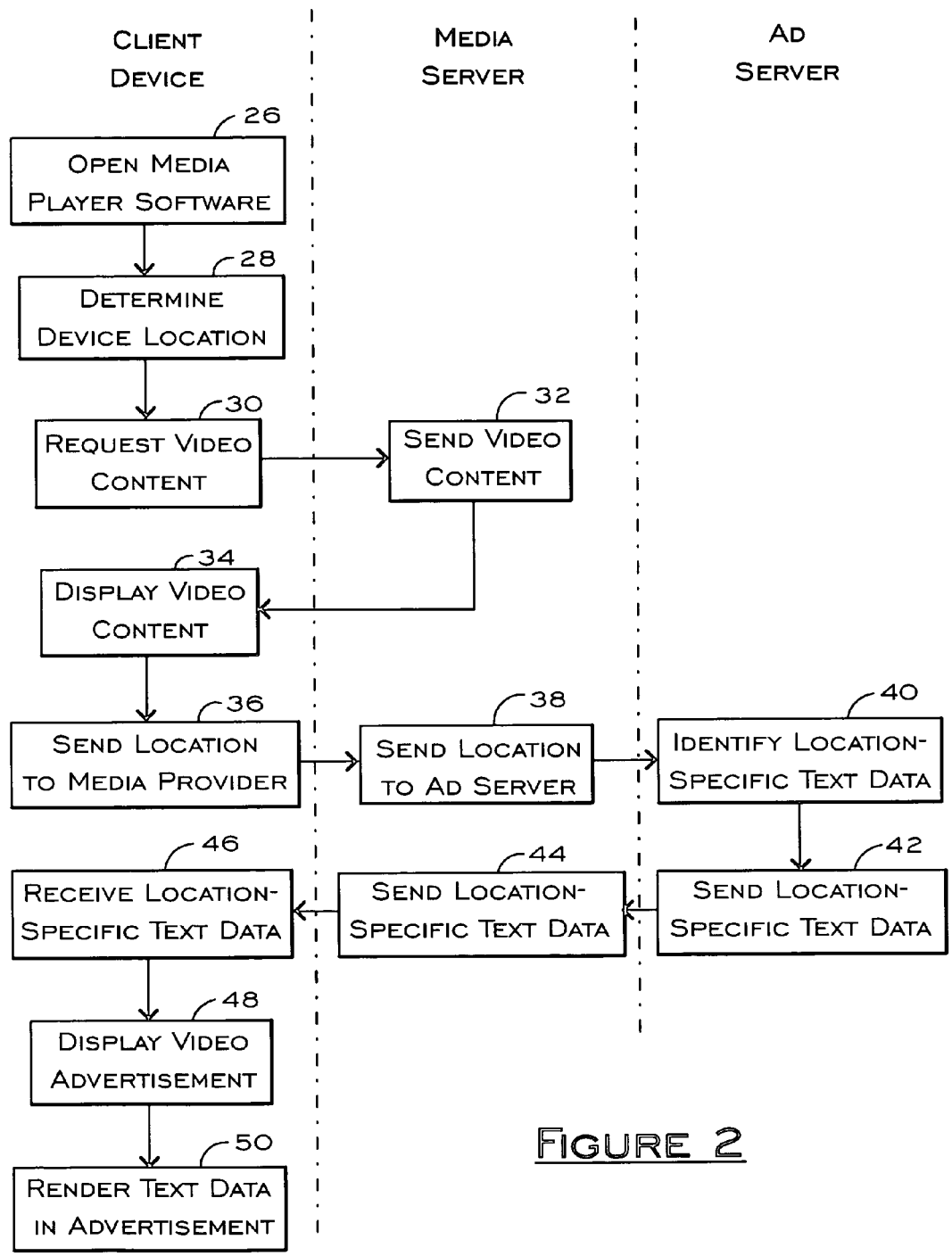
FIG. 2 is a flow diagram illustrating steps performed in providing a video presentation including location-based textual content.

One Exemplary Method for Providing a Location-Specific Multimedia Presentation, such as the presentation described in section II.A, above, is illustrated in FIG. 2. In the method as illustrated in FIG. 2, the various steps are performed by a client device (which may be a mobile device such as a mobile telephone), a media server, and an advertisement server. In various embodiments, the functions of the media server and advertisement server may be combined into a single server or even divided among more than two servers.

In step 26, media player software is opened on the client device. In step 28, the client device determines its location. This may be done with, for example, a GPS receiver embedded in the client device, or, in conjunction with a wireless communications network, through radio location. The determination of the client device's location may be performed continually, at regular or irregular intervals, updated as a part of an initialization routine of the media player software, and/or as part of registration with a base station, among other possibilities.

In step 30, the client device requests video content from the media server. This request may be made in response to, for example, a hyperlink or menu entry selected by a user of the client device, a URL (Uniform Resource Locator) entered by the user or an application program, or in response to other means of activation. The request itself may be sent in the form of an HTTP (Hypertext Transfer Protocol) GET or POST request, or it may be a request in another protocol, such as SIP (Session Initiation Protocol).

In step 32, in response to the request for video content, the media server locates and sends the video content to the client device. The video content may be sent as streaming content, as a downloadable file, or by other means appropriate to the type of request received. The video content may reside on a storage device (such as a hard drive) co-located with the media server, or the media server may fetch the content from a remote source.

In step 34, the client device displays the video content received from the media server. The video content may include both images and sound. The video content may further include a tag, metatag, flag, or other identifying information to indicate that the content is associated with location-based textual content. For example, a tag may be included at the beginning of the video content indicating that, at a particular time (e.g. 3 min and 57 seconds into the content), location-based textual content will be incorporated into the video content. In another example, a tag may be inserted in the midst of the content, at the position in which the location-based textual content will be incorporated. In a preferred embodiment, the tag indicates a location in an advertisement within the video content.

Either as a result of encountering a tag indicating the availability of location-based content, or for other reasons, the client device sends information on its location to the media server in step 36. The location information sent to the ad server may be sent in the request for video content of step 30, so that steps 30 and 36 are performed in a common request.

In step 38, the media server sends the location information to an ad server. In some embodiments, the media server selects an appropriate ad server from among a plurality of ad servers and sends the location information to that ad server. If necessary, the content server may also identify the video program and/or the advertisement within the video content for the ad server. If the ad server being contacted handles only one advertisement, or of the relevant advertisement may otherwise determined from the context, then providing this information may not be necessary.

Based on the location information received (and, if necessary, based on identification of the relevant advertisement or video program), the ad server in step 40 identifies textual data appropriate to the advertisement and to the location of the client device. For example, the ad server may determine the name, address, and contact information for a dealer near the client device that offers the goods or services displayed in the advertisement. In various alternative embodiments, other information may be used to select from among a set containing a plurality of pre-stored textual data. For example, other such information may include information about the user, the type of user device, the type of the network connection used by the device, and/or other information. The location-specific text data may be kept in a database indexed by information identifying the commercial, location information, and/or other information.

A database of text-based data may include addresses of dealers who make available products featured in commercial advertisements. The process of selecting text data may include identifying the dealer nearest to the location of the client device. In some embodiments, the ad server compares the dealer address stored in the database with the location of the client device to determine which one is the nearest dealer. A database of text-based data may include information on boundaries of a geographic region associated with different text-based data, so that location-specific data is selected based on the presence of the client device within the particular geographic region.

In a preferred embodiment, the location-specific text data is in XML format. One example of location-specific text data is provided in Example 1, below, which would result in the text display of segment 22 in FIG. 1.

Example 1.

```
<?xml version="1.0" encoding="UTF-8"?>
<dynamic_ad id="PLWJ57830GHE8-70U28574442JX-93R5T8">
   <ad_content>
      <style id="SPR-6701"/>
      <header>Stop by Today!</header>
      <main>
         <line>McCarthy Dodge</line>
         <line>10700 Metcalf Ave.</line>
         <line>Overland Park, KS</line>
         <line>(913) 642-4600</line>
      </main>
      <nav_options>
         <more_info/>
         <back_to_show/>
      </nav_options>
   </ad_content>
</dynamic_ad>
```

As seen in Example 1, the location-specific text data includes an advertisement identifier, "PLWJ57830 GHE8-70U28574442JX-93R5T8," which, if there are multiple advertisements in the video program, enables the media player software of the client device to associate the text data with the correct advertisement. The advertisement identifier may also appear in a tag in the video content.

Included within the location-specific text data, and identified by the tags "<header>" and "<main>", is the text that will be rendered within the advertisement. This text is displayed in segment 22 of FIG. 1.

The use of text data in place of, for example, a location-specific video clip inserted into a media presentation, allows multimedia presentations to be provided with location-specific features with a reduced amount of additional data required. For example, ad servers are not required to maintain hundreds or thousands of location-specific video clips for each location, which could be costly to produce and to store and could demand additional network resources to send to client devices. Text-based data, such as XML-structured data, requires fewer resources to create, to store, and to transmit relative to pre-generated location-specific video content.

In step 42, the ad server sends this text data to the media server, and in step 44, the media server sends the text data to the client device. The text data may be sent to the client device before the video content is sent, while the video content is sent, or even after the video content is sent. Preferably, the client device receives the text data before the appropriate segment (e.g., segment 22) of the video program is rendered, but if the text data is delayed, the client device may either skip that segment when presenting the program, or it may display a default (e.g. blank) screen during that segment. Default information to be displayed if location-specific information is unavailable may be provided as tagged data within the video content stream or file. The late-received text data may then be displayed during a subsequent viewing of the video program, particularly if the location of the client device has not substantially changed, or if the client device has been unable to receive updated location-specific text data.

In some embodiments, the location-specific text data may be changed in format by the media server. For example, text data of the following form (Example 2), or another form, may be sent from the ad server to the media server, where the media server parses and modifies it into the form illustrated in Example 1.

---
Example 2.
---
```
<?xml version="1.0" encoding="UTF-8"?>
<dealer_info>
   <address>
      <line>McCarthy Dodge</line>
      <line>Metcalf Ave.</line>
      <line>Overland Park, KS</line>
   </address>
   <phone>
      (913) 642-4600
   </phone>
</dealer_info>
```
---

In step 46, the client device receives the text data, and in step 48, the client device displays the video advertisement, and in step 50 the device renders the text data in the advertisement (as seen in segment 22 of FIG. 1). The client device may use one or more of several methods to render the text data in the advertisement. In one such method, the text data is overlaid on a segment of the video advertisement, so that video can, for example, continue to be presented in the background, with the text data in the foreground (or with the text along the top or bottom of the screen, as a few of the available alternatives). In another such method, the video advertisement interrupts or fades momentarily to a display of the text. In some embodiments, different portions of the text data may be displayed at different times. For example, the name and address of a dealer may be displayed in one segment and the URL of the dealer in the next segment.

III. A Location-Specific Multimedia Presentation System

Figure 3:
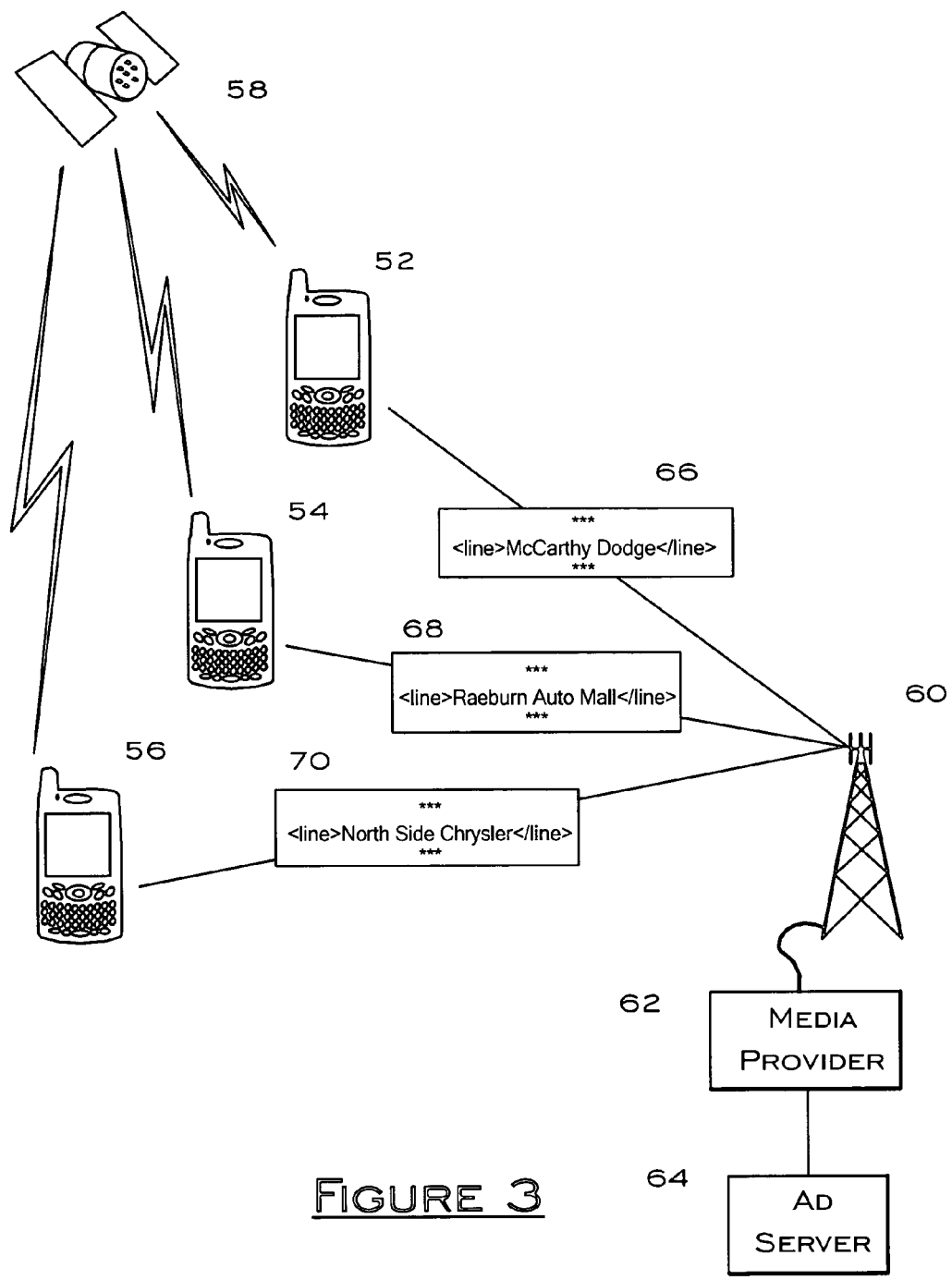
FIG. 3 is a schematic diagram of the functional architecture of a system for providing a video presentation including location-based textual content.

One example of a system for providing multimedia presentations that incorporate location-based text data is illustrated in FIG. 3. A plurality of client devices 52, 54, and 56 are operated by their respective users. The client devices 52, 54, and 56 are illustrated as wireless mobile devices (mobile telephones, in this case), but other user devices such as set-top boxes, computers, and/or television sets may be used. The client devices track their location through communications received from GPS satellites (one such satellite is illustrated at reference 58).

The system also includes a wireless communications facility 60, a media provider 62, and an ad server 64. Each of the client devices 52, 54, and 56 (possibly at different times) requests a video presentation from the media provider 62 through the wireless communications facility 60. The wireless communications facility 60 is preferably a wireless telecommunications network, such as a CDMA (code division multiple access) network employing EV-DO (evolution-data optimized) technology.

In response to requests from the client devices, the media provider 62 sends a video program (or programs) to the client devices through the telecommunications facility 60. The program, in some embodiments, includes a tag corresponding to an advertisement included within the program. In response to receiving the tag, the client devices determine their respective locations and communicate that location information to the media provider.

The media provider 62 provides this location information to the ad server 64 and requests text data that corresponds to the respective locations of the client devices. This text data is then wirelessly distributed to the client devices.

Text boxes 66, 68, and 70 illustrate excerpts of different text data that is sent to different client devices in different locations. The client device 52, for example, receives location-based text information identifying "McCarthy Dodge" as a nearby dealer (as in the exemplary multimedia presentation of FIG. 1). Client devices 54 and 56 may receive and display the same video presentation (including the same commercial advertisement) as client device 52, except that, being in different locations, they receive and render different text data together with the advertisement. As illustrated in FIG. 3, client device 54 receives text data identifying nearby dealer "Raeburn Auto Mall," while client device 56 receives text data identifying nearby dealer "North Side Chrysler."

It should be understood that the location-based text data sent to the client devices is preferably sent in an electronically encoded form, which may include compression and/or encryption.

The examples given above have been used to illustrate different features that may be implemented according to the present invention. The scope of the invention, however, is limited only by the following claims.

The invention claimed is:

1. A method performed by one or more computer servers, comprising:
   receiving a request for media content from a first client device;
   sending the media content to the first client device, wherein the media content includes a tag operative to trigger the sending of location information;
   receiving first location information from the first client device, wherein the first location information identifies the location of the first client device;
   depending on the first location information, identifying first location-based information that corresponds to the media content;
   sending the first location-based information to the first client device;
   receiving a second request for the media content from a second client device different from the client device;
   sending the media content to the second client device;
   receiving second location information from the second client device, wherein the second location information identifies the location of the second client device;

depending on the second location information, identifying second location-based information that corresponds to the media content; and sending the second location-based information to the second client device, wherein the media content sent to the first client device and the second client device is the same media content, and the location-based information sent to the second client device is different from the location-based information sent to the first client device.

2. The method of claim 1, wherein the request for media content and the location information are received in a single message from the client device.

3. The method of claim 1, wherein the location-based information is text-based content.

4. The method of claim 1, wherein the media content is video content.

5. A method comprising:

sending video content to a first client device, wherein the video content includes a tag operative to trigger the sending of location information;

responsively receiving a location of the first client device;

selecting, from a pre-stored set of text-based content, first text-based content associated with the location of the first client device and with the video content;

sending the first text-based content to the first client device;

sending the video content to a second client device different from the first client device;

selecting, from the pre-stored set of text-based content, second text-based content associated with a location of the second client device and with the video content; and sending the second text-based content to the second client device, wherein the location of the second client device is different from the location of the first client device, and wherein the second text-based content is different from the first text-based content.

6. The method of claim 5, wherein the video content is an advertisement for a product, and the text-based content includes an address of an establishment that makes the product available.

7. The method of claim 6, wherein the address is of a type selected from the group consisting of a street address, a uniform resource locator, and a telephone number.

8. The method of claim 7, wherein the address is a street address and the selected text-based content is associated with the location of the client device by virtue of proximity of the client device to the street address.

9. The method of claim 5, wherein at least one entry in the pre-stored set of text-based content is associated with a geographic area, and wherein the selection of the selected text-based content includes identifying at least one entry associated with a geographic area in which the client device is located.

10. The method of claim 5, wherein the selected text-based content includes extensible markup language content.

11. The method of claim 10, wherein the selected text-based content includes hypertext markup language content.

12. The method of claim 5, wherein the video content is streaming media content.

\* \* \* \* \*